(12) United States Patent
Chen et al.

(10) Patent No.: US 9,030,977 B2
(45) Date of Patent: May 12, 2015

(54) METHODS AND APPARATUS FOR TRANSPORT BLOCK SIZE DETERMINATION

(75) Inventors: Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 12/904,664

(22) Filed: Oct. 14, 2010

(65) Prior Publication Data

US 2011/0090808 A1 Apr. 21, 2011

Related U.S. Application Data

(60) Provisional application No. 61/252,109, filed on Oct. 15, 2009.

(51) Int. Cl.
| | |
|---|---|
| *H04W 4/00* | (2009.01) |
| *H04L 1/00* | (2006.01) |
| *H04B 7/155* | (2006.01) |
| *H04W 28/18* | (2009.01) |
| *H04B 7/26* | (2006.01) |
| *H04W 84/04* | (2009.01) |

(52) U.S. Cl.
CPC .......... *H04L 1/0006* (2013.01); *H04B 7/15542* (2013.01); *H04B 7/2606* (2013.01); *H04L 1/0002* (2013.01); *H04L 1/0016* (2013.01); *H04L 2001/0097* (2013.01); *H04W 84/047* (2013.01); *H04W 28/18* (2013.01)

(58) Field of Classification Search
USPC ................. 370/252, 310, 328, 329, 344, 400; 455/434, 511, 517, 522
See application file for complete search history.

(56) References Cited

U.S. PATENT DOCUMENTS

2005/0094615 A1* 5/2005 Kim et al. ...................... 370/349
2006/0281417 A1* 12/2006 Umesh et al. .................... 455/69
(Continued)

FOREIGN PATENT DOCUMENTS

| CN | 101222264 A | 7/2008 | |
| DE | EP2106057 | * 9/2009 | ............... H04L 5/02 |

(Continued)

OTHER PUBLICATIONS

International Search Report and Written Opinion—PCT/US2010/052831, International Search Authority—European Patent Office—Feb. 4, 2011.
(Continued)

*Primary Examiner* — Habte Mered
*Assistant Examiner* — Prince A Mensah
(74) *Attorney, Agent, or Firm* — Michael J. DeHaemer, Jr.

(57) ABSTRACT

Methods and apparatus for determining transport block sizes for relaying backhaul subframes from a relay node to a donor base station are described. A transport block size may be adjusted at a relay node by an adjustment factor. The adjustment factor may be based on parameters such as propagation delay between the relay node and donor base station, a multiplexing configuration of control and data information in a relay node subframe, a switching time in a relay node subframe between a downlink and an uplink partition of the subframe, and/or other channel or configuration characteristics.

47 Claims, 11 Drawing Sheets

(56) References Cited

U.S. PATENT DOCUMENTS

| | | | |
|---|---|---|---|
| 2008/0020779 A1* | 1/2008 | Ode et al. | 455/450 |
| 2008/0225784 A1* | 9/2008 | Tseng | 370/329 |
| 2009/0196195 A1* | 8/2009 | Gerstenberger et al. | 370/252 |
| 2010/0195614 A1* | 8/2010 | Nimbalker et al. | 370/330 |
| 2010/0290412 A1* | 11/2010 | Ahn et al. | 370/329 |

FOREIGN PATENT DOCUMENTS

| | | | |
|---|---|---|---|
| JP | 2008172792 A | 7/2008 |
| JP | 2008193240 A | 8/2008 |
| JP | 2009130790 A | 6/2009 |

OTHER PUBLICATIONS

Anonymous, "3GPP TR 36.912 V9.0.0 (Sep. 2009)Technical Report 3rd Generation Partnership Project-Technical Specification Group Radio Access Network; Feasibility study for Further Advancements for E-UTRA (LTE-Advanced) (Release 9)", 3GPP, Sep. 28, 2009, XP002617915, Internet Publication, Retrieved from the Internet: URL:http://www.3gpp.org/ftp/Specs/html-inf o/36912.htm [retrieved on Jan. 21, 2011].

LG Electronics: "Resource Allocation and Downlink Control Channel Structure for Relay Backhaul Link", 3GPP TSG RAN WG1 Meeting #58, R1-093246, pp. 1-4, Aug. 24-28, 2009.

Taiwan Search Report—TW099135276—TIPO—May 19, 2014.

* cited by examiner

Table 7.1.7.2.1-1: Transport block size table (dimension 27×110)

| $I_{TBS}$ | \multicolumn{10}{c}{$N_{PRB}$} |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 532 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |

520

510

*Example Transport Block Size (TBS) Table*

FIG. 5

METHODS AND APPARATUS FOR TRANSPORT BLOCK SIZE DETERMINATION

CROSS-REFERENCE TO RELATED APPLICATIONS

This application claims priority under 35 U.S.C. §119(e) to U.S. Provisional Patent Application Ser. No. 61/252,109 entitled WIRELESS COMMUNICATION TRANSPORT BLOCK SIZE DETERMINATION, filed on Oct. 15, 2009, the content of which is hereby incorporated by reference herein in its entirety for all purposes.

FIELD

This application is directed generally to wireless communications systems. More particularly, but not exclusively, the application relates to methods and apparatus for determining transport block sizes for relaying backhaul subframes.

BACKGROUND

Wireless communication systems are widely deployed to provide various types of communication content such as voice, data, video and the like, and deployments are likely to increase with introduction of new data oriented systems such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems and other orthogonal frequency division multiple access (OFDMA) systems.

Generally, a wireless multiple-access communication system can simultaneously support communication for multiple wireless terminals (also know as user equipments (UEs), or access terminals (ATs). Each terminal communicates with one or more base stations (also know as access points (APs), EnodeBs or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via a single-in-single-out, single-in-multiple out, multiple-in-single-out or a multiple-in-multiple-out (MIMO) system.

Relay Nodes (RNs) have been considered for use in wireless communications systems. A RN may be located between terminals, such as UEs, and base stations, such as eNBS, to provide range extension, increase data rates, facilitate UE mobility, improve cell edge coverage, as well as providing other functions.

SUMMARY

This disclosure relates generally to wireless communications systems. For example, in one aspect, the disclosure relates to apparatus and method for adjusting a transport block size, such as at a relay node in communication with a donor base station, based on an adjustment factor. In some embodiments, transport block sizes associated with multiple relay nodes associated with the donor base station may be adjusted using different adjustment factors or adjustment information.

In another aspect, the disclosure relates to a method for providing communications, such as at a relay node. The method may include, for example, receiving, at a relay node (RN) from a donor base station (DeNB), a downlink transmission grant. The method may further include determining, at the RN, an adjusted transmit block size (TBS) based on information in the transmission grant and an adjustment factor.

The determining may include, for example, adjusting an index to a TBS lookup table based on the adjustment factor. The adjustment factor may be based on, for example, a propagation delay and/or time offset between the RN and the DeNB. The adjustment factor may be based on, for example, a multiplexing configuration of control and data information in an RN subframe. The adjustment factor may be based on, for example, a switching time in an RN subframe between a downlink (DL) and an uplink (UL) partition of the subframe. The adjustment factor may be based on, for example, a timing offset between the RN and the DeNB. The adjustment factor may be based on, for example, the available resource elements per resource block, such as for all the resource blocks assigned to the RN. The adjustment factor may be based on, for example, a combination of the above-described parameters, and/or others. In some embodiments, the adjustment factor may be based on two or more of a propagation delay between the RN and the DeNB, a multiplexing configuration of control and data information in an RN subframe, and a switching time in an RN subframe between a DL and an UL partition of the subframe.

The adjustment factor may be determined, for example, at the RN. The adjustment factor may be determined at, for example, the DeNB, or at a combination of the DeNB and the RN. In some embodiments, the adjustment factor may be determined at other network nodes, such as, for example, at one or more nodes of an associated core network.

The adjustment factor may be based on, for example, a fixed parameter or value. The adjustment factor may be layer 3 (i.e., MAC layer) configured. The adjustment factor may be dynamically generated, for example, at the DeNB, the RN, a combination of the DeNB and the RN, and/or in combination with other nodes, and may be based on a channel condition or radio transmission characteristic.

The method may further include, for example, providing feedback from the RN to the DeNB usable for determining the adjustment factor. The method may further include receiving, from the eNB, based at least in part on the feedback, the adjustment factor or data for use in determining the adjustment factor. The method may further include transmitting a signal consistent with the adjusted TBS from the RN.

In another aspect, the disclosure relates to a method for providing communications, such as at a donor base station or eNB. The method may include establishing, at a donor eNB (DeNB), a connection with a first relay node (RN). The method may further include sending, from the DeNB to the RN, a downlink (DL) transmission grant and information usable for adjusting a transport block size (TBS) at the RN.

The information for adjusting the TBS may be based on, for example, a propagation delay between the RN and the donor eNB. The information for adjusting the TBS may be based on, for example, a multiplexing configuration of control and data information in an RN subframe. The information for adjusting the TBS may be based on, for example, a switching time in an RN subframe between a downlink (DL) and an uplink (UL) subframe partition. The information for adjusting the TBM may be based on, for example, a timing offset between the RN and the DeNB. The information for adjusting may be based on, for example, the available resource elements per resource block, such as for all the resource blocks assigned to the RN. The information may be based on combinations of the above-described parameters, as well as others. For example, the information may be based on two or more of a propagation delay between the RN and the DeNB, a multiplexing configuration of control and data information in an RN subframe, and a switching time in an RN subframe between a DL and an UL partition of the subframe.

The information may include, for example, an adjustment factor usable to generate an adjusted TBS at the RN by adjusting a lookup table index. The adjustment factor may be generated at the DeNB based on information received from the RN. The adjustment factor or information for generating the adjustment factor may be generated in part at the RN and provided to the DeNB. In some cases, the adjustment factor or information for generating the adjustment factor may be generated at the RN and provided to the DeNB. The information or adjustment factor may be predefined. The information or adjustment factor may be level 3 configured. The information or adjustment factor may be dynamically generated at the DeNB based on a channel condition or radio transmission characteristics.

The method may further include, for example, receiving feedback from the RN at the DeNB usable for determining the adjustment factor. The method may further include generating, based at least in part on the feedback, the information usable for adjusting the transport block size. The method may further include receiving, from the first RN, a signal consistent with the adjusted TBS.

The method may further include, for example, establishing a second connection with a second RN. The method may further include sending, from the DeNB to the second RN, a second downlink (DL) transmission grant and second information usable for adjusting a transport block size (TBS) at the second RN. The second information may be different than the first information. Adjustment factors used by the first RN and the second RN may be different. The different adjustment factors may be based on different configuration parameters and/or channel characteristics.

In another aspect, the disclosure relates to communication devices configured to perform the above-described methods.

In another aspect, the disclosure relates to communication devices including means for performing the above-described methods.

Additional aspects, features, and functionality are further described below in conjunction with the appended drawings.

BRIEF DESCRIPTION OF THE DRAWINGS

The present application may be more fully appreciated in connection with the following detailed description taken in conjunction with the accompanying drawings, wherein:

FIG. 5 illustrates an example lookup table for determining a transport block size (TBS).

DETAILED DESCRIPTION

Figure 1:
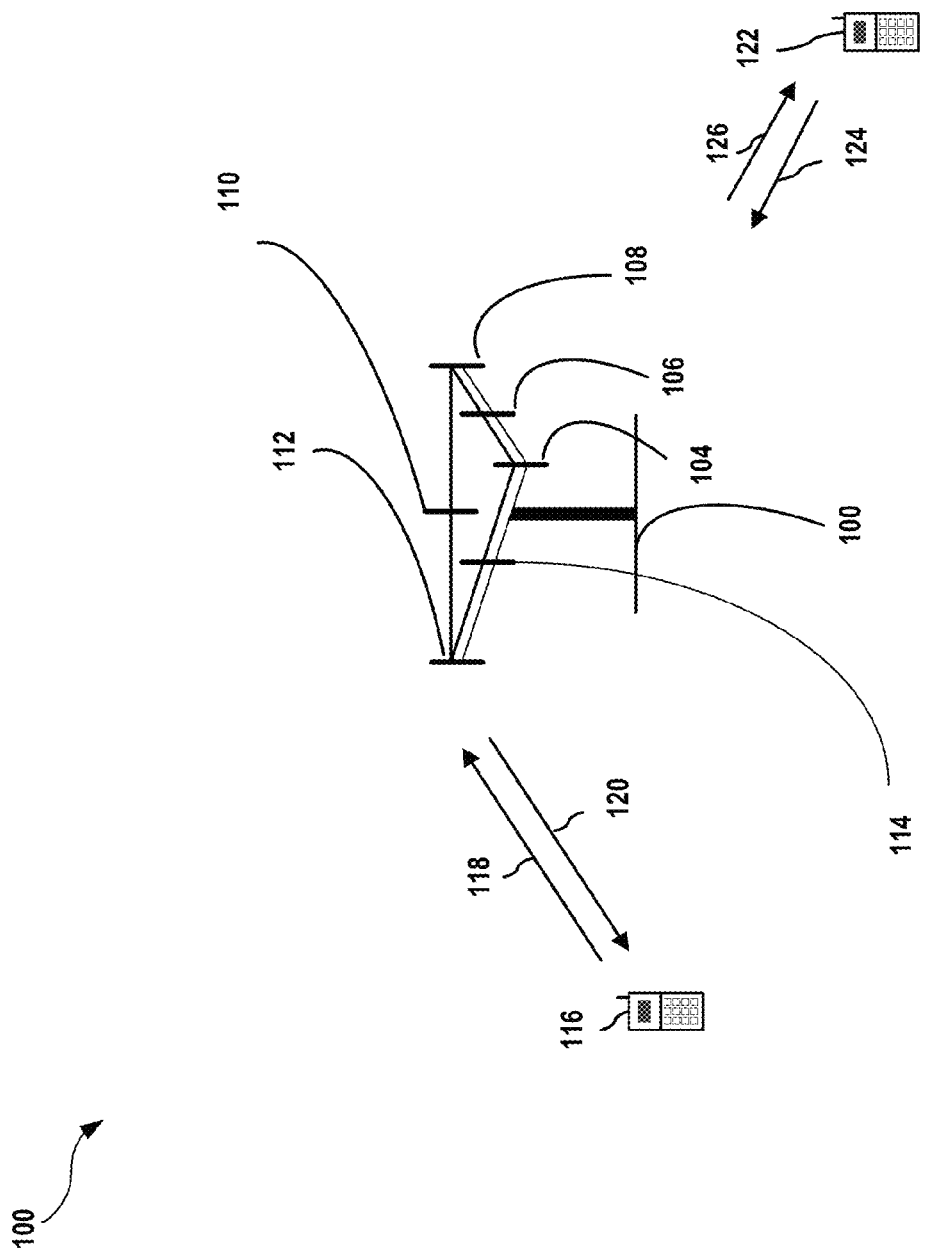
FIG. 1 illustrates details of a wireless communications system.

This disclosure relates generally to interference coordination, management, and mitigation in wireless communications systems. In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, as well as other communications networks. As described herein, the terms "networks" and "systems" may be used interchangeably.

A CDMA network may implement a radio technology such as Universal Terrestrial Radio Access (UTRA), cdma2000 and the like. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, Long Term Evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices. For clarity, certain aspects of the apparatus and techniques are described below for LTE implementations, and LTE terminology is used in much of the description below; however, the description is not intended to be limited to LTE applications. Accordingly, it will be apparent to one of skill in the art that the apparatus and methods described herein may be applied to various other communications systems and applications.

Logical channels in wireless communications systems may be classified into Control Channels and Traffic Channels. Logical Control Channels may include a Broadcast Control Channel (BCCH) which is a downlink (DL) channel for broadcasting system control information, a Paging Control Channel (PCCH) which is a DL channel that transfers paging information and a Multicast Control Channel (MCCH) which is a point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS. A Dedicated Control Channel (DCCH) is a point-to-point bi-directional channel that transmits dedicated control information and is used by UEs having an RRC connection.

Logical Traffic Channels may include a Dedicated Traffic Channel (DTCH) which is point-to-point bi-directional channel, dedicated to one UE, for the transfer of user information, and a Multicast Traffic Channel (MTCH) for Point-to-multipoint DL channel for transmitting traffic data.

Transport Channels may be classified into downlink (DL) and uplink (UL) Transport Channels. DL Transport Channels may include a Broadcast Channel (BCH), Downlink Shared Data Channel (DL-SDCH) and a Paging Channel (PCH). The PCH may be used for support of UE power saving (when a DRX cycle is indicated by the network to the UE), broadcast over an entire cell and mapped to Physical Layer (PHY) resources which can be used for other control/traffic channels. The UL Transport Channels may include a Random Access Channel (RACH), a Request Channel (REQCH), an Uplink Shared Data Channel (UL-SDCH) and a plurality of PHY channels. The PHY channels may include a set of DL channels and UL channels.

In addition, the DL PHY channels may include the following:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels may include the following:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

The word "exemplary" is used herein to mean "serving as an example, instance, or illustration." Any aspect and/or embodiment described herein as "exemplary" is not necessarily to be construed as preferred or advantageous over other aspects and/or embodiments.

For purposes of explanation of various aspects and/or embodiments, the following terminology and abbreviations may be used herein:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multicast broadcast single frequency network
MCE MBMS coordinating entity
MCH Multicast channel
DL-SCH Downlink shared channel
MSCH MBMS control channel
PDCCH Physical downlink control channel
PDSCH Physical downlink shared channel A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. The maximum spatial multiplexing $N_S$ if a linear receiver is used is min($N_T$, $N_R$), with each of the $N_S$ independent channels corresponding to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The special dimension may be described in terms of a rank.

MIMO systems support time division duplex (TDD) and frequency division duplex (FDD) implementations. In a TDD system, the forward and reverse link transmissions use the same frequency regions so that the reciprocity principle allows the estimation of the forward link channel from the reverse link channel. This enables the access point to extract transmit beamforming gain on the forward link when multiple antennas are available at the access point.

System designs may support various time-frequency reference signals for the downlink and uplink to facilitate beamforming and other functions. A reference signal is a signal generated based on known data and may also be referred to as a pilot, preamble, training signal, sounding signal and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas, however, LTE systems do not in general provide for coordination of sending of reference signals from multiple base stations or eNBs.

3GPP Specification 36211-900 defines in Section 5.5 particular reference signals for demodulation, associated with transmission of PUSCH or PUCCH, as well as sounding, which is not associated with transmission of PUSCH or PUCCH. For example, Table 1 lists some reference signals for LTE implementations that may be transmitted on the downlink and uplink and provides a short description for each reference signal. A cell-specific reference signal may also be referred to as a common pilot, a broadband pilot and the like. A UE-specific reference signal may also be referred to as a dedicated reference signal.

TABLE 1

| Link | Reference Signal | Description |
| --- | --- | --- |
| Downlink | Cell Specific Reference Signal | Reference signal sent by a Node B and used by the UEs for channel estimation and channel quality measurement. |
| Downlink | UE Specific Reference Signal | Reference signal sent by a Node B to a specific UE and used for demodulation of a downlink transmission from the Node B. |
| Uplink | Sounding Reference Signal | Reference signal sent by a UE and used by a Node B for channel estimation and channel quality measurement. |
| Uplink | Demodulation Reference Signal | Reference signal sent by a UE and used by a Node B for demodulation of an uplink transmission from the UE. |

In some implementations a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. A reciprocity principle may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations orthogonal frequency division multiplexing is used for the downlink—that is, from a base station, access point or eNodeB (eNB) to a terminal or UE. Use of OFDM meets the LTE requirement for spectrum flexibility and enables cost-efficient solutions for very wide carriers with high peak rates, and is a well-established technology, for example OFDM is used in standards such as IEEE 802.11a/g, 802.16, HIPERLAN-2, DVB and DAB.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in 3GPP TS 36.211.

UMTS LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every sub frame consists of 2 slots, where each slot is 0.5 ms. The subcarrier spacing in the frequency domain in this case is 15 kHz. Twelve of these subcarriers together (per slot) constitutes an RB, so in this implementation one resource block is 180 kHz. 6 Resource blocks fit in a carrier of 1.4 MHz and 100 resource blocks fit in a carrier of 20 MHz.

In the downlink there are typically a number of physical channels as described above. In particular, the physical downlink control channel (PDCCH) is used for sending control, the physical hybrid ARQ indicator channel (PHICH) for sending ACK/NACK, the physical control format indicator channel (PCFICH) for specifying the number of control symbols, the Physical Downlink Shared Channel (PDSCH) for data transmission, the Physical Multicast Channel (PMCH) for broadcast transmission using a Single Frequency Network (SFN), and the Physical Broadcast Channel (PBCH) for sending important system information within a cell. Supported modulation formats on the PDSCH in LTE are QPSK, 16QAM and 64QAM. Various modulation and coding schemes are defined for the various channels in the 3GPP specification.

In the uplink there are typically three physical channels. While the Physical Random Access Channel (PRACH) is only used for initial access and when the UE is not uplink synchronized, the data is sent on the Physical Uplink Shared Channel (PUSCH). If there is no data to be transmitted on the uplink for a UE, control information would be transmitted on the Physical Uplink Control Channel (PUCCH). Supported modulation formats on the uplink data channel are QPSK, 16QAM and 64QAM.

If virtual MIMO/spatial division multiple access (SDMA) is introduced the data rate in the uplink direction can be increased depending on the number of antennas at the base station. With this technology more than one mobile can reuse the same resources. For MIMO operation, a distinction is made between single user MIMO, for enhancing one user's data throughput, and multi user MIMO for enhancing the cell throughput.

In 3GPP LTE, a mobile station or device may be referred to as a "terminal," "user device," or "user equipment" (UE). A base station may be referred to as an evolved NodeB or eNB. A semi-autonomous base station may be referred to as a home eNB or HeNB. An HeNB may thus be one example of an eNB. The HeNB and/or the coverage area of an HeNB may be referred to as a femtocell, an HeNB cell or a closed subscriber group (CSG) cell (where access is restricted).

Various other aspects and features of the disclosure are further described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates details of an implementation of a multiple access wireless communication system, which may be an LTE system, on which aspects as further described subsequently may be implemented. An evolved NodeB (eNB) 100 (also know as an access point or AP) may include multiple antenna groups, one including 104 and 106, another including 108 and 110, and an additional including 112 and 114. In FIG. 1, only two antennas are shown for each antenna group, however, more or fewer antennas may be utilized for each antenna group. A user equipment (UE) 116 (also known as an access terminal or AT) is in communication with antennas 112 and 114, where antennas 112 and 114 transmit information to UE 116 over forward link (also known as a downlink) 120 and receive information from UE 116 over reverse link (also known as an uplink) 118. A second UE 122 is in communication with antennas 106 and 108, where antennas 106 and 108 transmit information to UE 122 over forward link 126 and receive information from access terminal 122 over reverse link 124.

In a frequency division duplex (FDD) system, communication links 118, 120, 124 and 126 may use different frequency for communication. For example, forward link 120 may use a different frequency then that used by reverse link 118. In a time division duplex (TDD) system, downlinks and uplinks may be shared.

Each group of antennas and/or the area in which they are designed to communicate is often referred to as a sector of the eNB. Antenna groups each are designed to communicate to UEs in a sector of the areas covered by eNB 100. In communication over forward links 120 and 126, the transmitting antennas of eNB 400 utilize beam-forming in order to improve the signal-to-noise ratio of forward links for the different access terminals 116 and 124. Also, an eNB using beam-forming to transmit to UEs scattered randomly through its coverage causes less interference to UEs in neighboring cells than an eNB transmitting through a single antenna to all its UEs. An eNB may be a fixed station used for communicating with the UEs and may also be referred to as an access point, a Node B, or some other equivalent terminology. A UE may also be called an access terminal, AT, user equipment, wireless communication device, terminal, or some other equivalent terminology.

Figure 2:
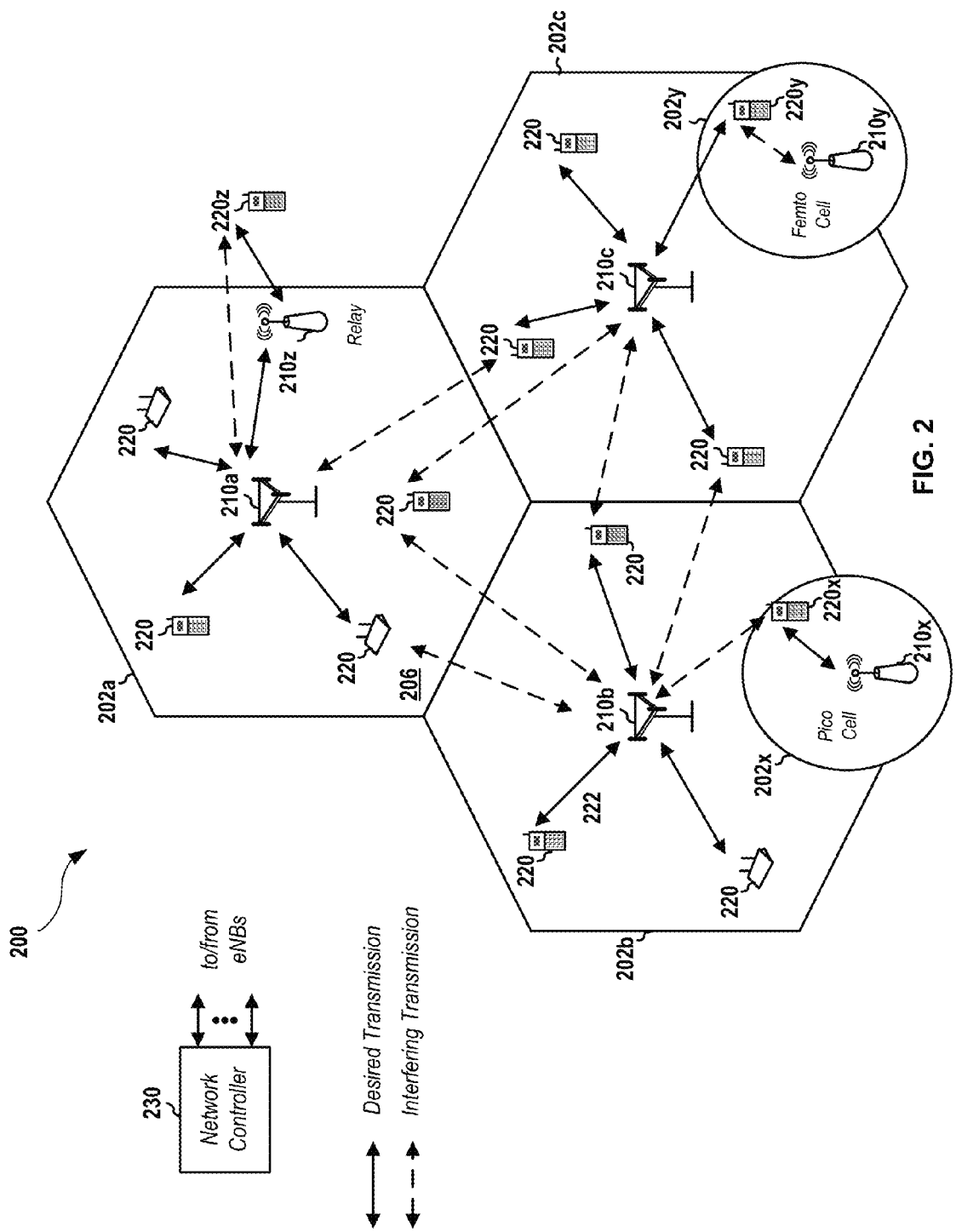
FIG. 2 illustrates details of a wireless communications system having multiple cells.

FIG. 2 illustrates a wireless communication network 200, which may be an LTE network. Wireless network 200 may include a number of evolved Node Bs (eNBs) 210 and other network entities. An eNB may be a station that communicates with the UEs and may also be referred to as a base station, a Node B, an access point, etc. Each eNB 210 may provide communication coverage for a particular geographic area. To improve network capacity, the overall coverage area of an eNB may be partitioned into multiple (e.g., three) smaller areas. In 3GPP, the term "cell" can refer to the smallest coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell, e.g., UEs for users in the home, UEs for users subscribing to a special service plan, etc. An eNB for a macro cell may be referred to as a macro eNB. An eNB for a pico cell may be referred to as a pico eNB. An eNB for a femto cell may be referred to as a femto eNB or a home eNB. In the example shown in FIG. 2, eNBs 210a, 210b and 210c may be macro eNBs for macro cells 202a, 202b and 202c, respectively. eNB 210x may be a pico eNB for a pico cell 202x. eNB 210y may be a femto eNB for a femto cell 202y.

Wireless network 200 may also include relay stations or nodes (RNs). A relay node is a station that receives a transmission of data and/or other information from an upstream station (e.g., an eNB or a UE) and sends a transmission of the data and/or other information to a downstream station (e.g., a UE or an eNB). In the example shown in FIG. 2, a relay node 210z may communicate with eNB 210a and a UE 220z to facilitate communication between eNB 210a and UE 220z. A relay node may also be referred to as a relay eNB, a relay, etc. In the description herein, a "station" may be a UE, a relay node or RN, or some other entity capable of receiving and sending information.

A network controller 230 may couple to a set of eNBs and provide coordination and control for these eNBs. Network controller 230 may be a single network entity or a collection of network entities. Network controller 230 may communicate with eNBs 210 via a backhaul. eNBs 210 may also communicate with one another, e.g., directly or indirectly via wireless or wireline backhaul.

Wireless network 200 may be a homogeneous network that includes only macro eNBs. Wireless network 100 may also be a heterogeneous network that includes eNBs of different types, e.g., macro eNBs, pico eNBs, femto eNBs, relays, etc. These different types of eNBs may have different transmit power levels, different coverage areas, and different impact on interference in wireless network 200. For example, macro eNBs may have a high transmit power level (e.g., 20 Watts) whereas pico eNBs, femto eNBs, and relays may have a lower transmit power level (e.g., 1 Watt). The techniques described herein may be used for homogeneous and heterogeneous networks.

UEs 220 may be dispersed throughout wireless network 200, and each UE may be stationary or mobile. A UE may also be referred to as a terminal, a mobile station, a subscriber unit, a station, etc. For example, a UE may be a cellular phone, a personal digital assistant (PDA), a wireless modem, a wireless communication device, a handheld device, a laptop computer, a cordless phone, a wireless local loop (WLL) station, etc. A UE may communicate with an eNB via the downlink (DL) and uplink (UL). The downlink (or forward link) refers to the communication link from the eNB to the UE, and the uplink (or reverse link) refers to the communication link from the UE to the eNB. A UE may be able to communicate with macro eNBs, pico eNBs, femto eNBs, relay nodes, and/or other types of eNBs. In FIG. 2, a solid line with double arrows indicates desired transmissions between a UE and a serving eNB, which is an eNB designated to serve the UE on the downlink and/or uplink. A dashed line with double arrows indicates interfering transmissions between a UE and an eNB.

Figure 3:
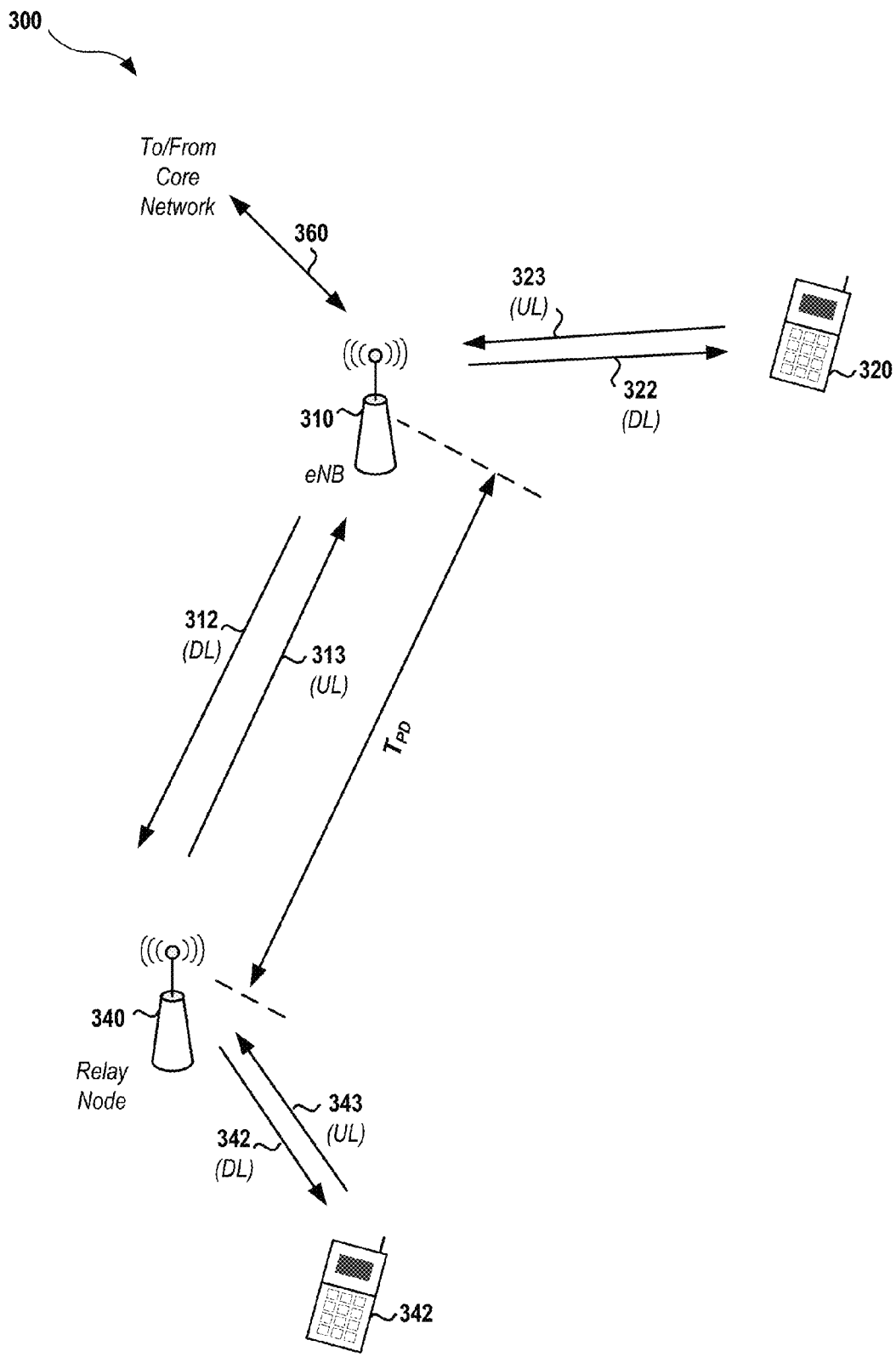
FIG. 3 illustrates details of a wireless communications system configuration including a relay node (RN).

FIG. 3 illustrates additional details of a communication system 300 configuration including an eNB 310, which may be in communication with a served UE 320, via DL 322 and UL 323. eNB 310 may also function as a donor eNB (DeNB) with respect to one or more relay nodes, such as RN 340 via DL 312 and UL 313. A propagation delay, $T_{PD}$, may characterize the delay in signal transmission between RN 340 and eNB 310. In some cases, where distances are substantial (e.g., on the order of 10 s of kilometers), the delay, $T_{PD}$, may be as large as several OFDM symbols. In other cases where RN 340 and eNB 310 are close, the delay may be insignificant.

In some cases, a timing offset may be defined or assigned for transmissions between the RN and eNB. In this case, an adjustment factor or related information for adjusting transmission block size may be based on the timing offset between the RN and the DeNB.

RN 340 may be in communication with one or more terminals or UEs, such as UE 342, via DL 342 and UL 343 to provide relay functionality with respect to connectivity between eNB 310 and UE 342. eNB 310 may also be in communication with a core or backhaul network (not shown), such as via link 360. As described in further detail subsequently, in accordance with some aspects, a transmission block size (TBS) may be adjusted based on the propagation delay. TBS adjustment may be also done in combination with other parameters as described subsequently herein.

Figure 4:
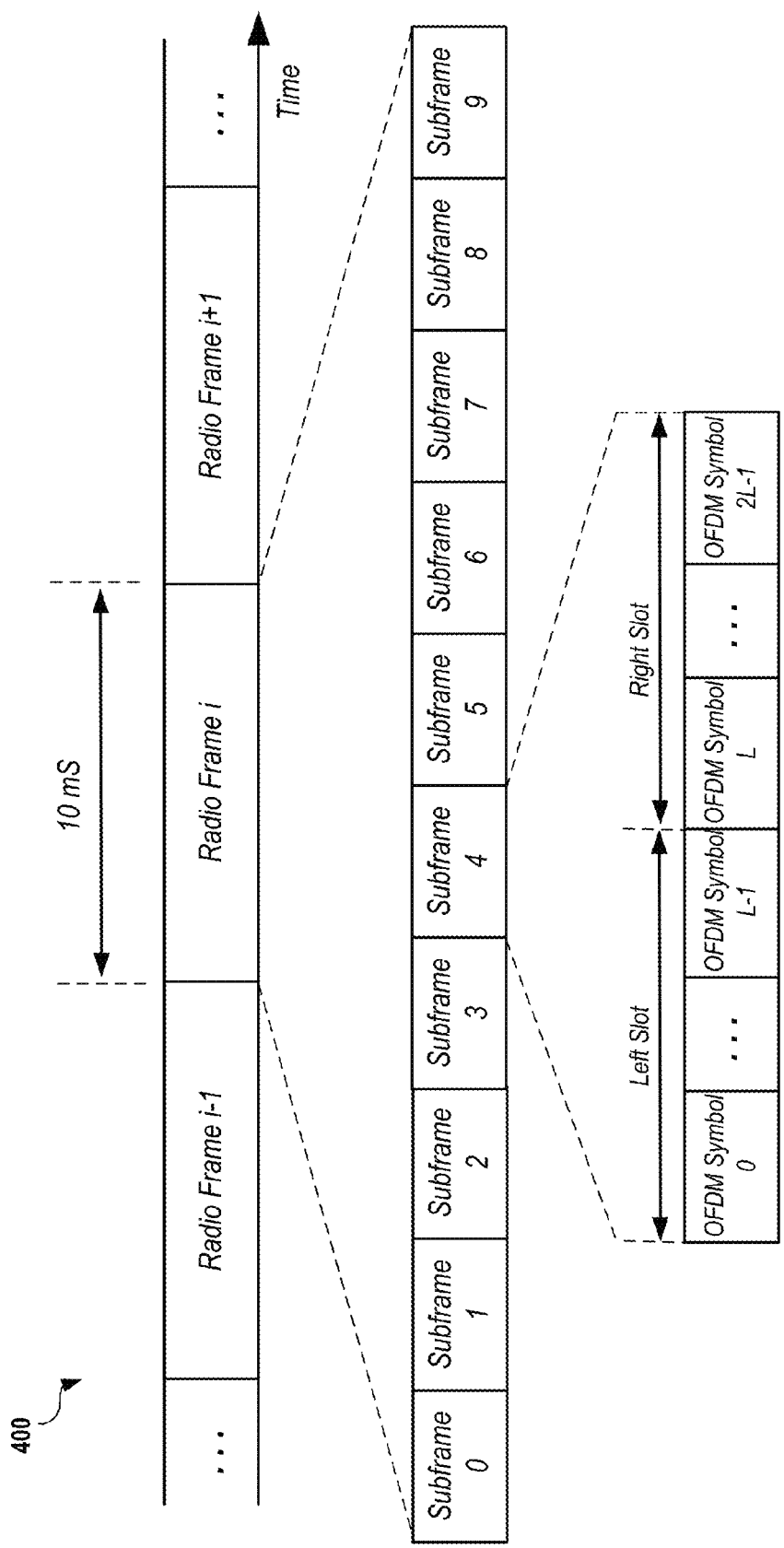
FIG. 4 illustrates an example frame configuration.

FIG. 4 illustrates an example frame structure 400 that may be used for radio transmission, such as in systems as shown in FIGS. 2 and 3. In particular, as shown in frame structure 400, the transmission timeline may be partitioned into units of radio frames and subframes. Each radio frame may have a predetermined duration (e.g., 10 milliseconds (ms) in LTE) and may be partitioned into 10 subframes with indices of 0 through 9. Each subframe may be further partitioned include two slots, and each slot may include L OFDM symbol periods. In LTE, L may be equal to 6 for an extended cyclic prefix or 7 for a normal cyclic prefix. Control and data signaling may be allocated to the subframes as, for example, is described subsequently.

As noted previously, LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively. On the downlink, each subframe may include 2 L OFDM symbols in symbol periods 0 through 2 L-1, as shown in FIG. 4. On the uplink, each subframe may include 2 L SC-FDMA symbols in symbol periods 0 through 2 L-1 (not shown in FIG. 4).

LTE supports transmission of unicast information to specific UEs. LTE also supports transmission of broadcast information to all UEs and multicast information to a group of UEs. A multicast/broadcast transmission may also be referred to as a multicast broadcast single frequency network (MBSFN) transmission. A subframe used for sending unicast information may be referred to as a regular subframe. A subframe used for sending multicast and/or broadcast information may be referred to as an MBSFN subframe, a broadcast subframe, etc.

In general, an MBSFN subframe is a subframe that carries a reference signal and certain control information in a first part of the subframe and may or may not carry multicast/broadcast data in a second part of the subframe. An eNB may declare a subframe as an MBSFN subframe (e.g., via system information) to legacy UEs. These legacy UEs would then expect the reference signal and control information in the first part of the MBSFN subframe consistent with defined MBSFN signaling. The eNB may separately inform a legacy UE (e.g., via upper layer signaling) to expect broadcast data in the second part of the MBSFN subframe, and the legacy UE would then expect broadcast data in the second part. In some implementations, the eNB may also not inform any legacy UE to expect broadcast data in the second part of the MBSFN subframe, and the legacy UEs would not expect broadcast data in the second part.

In accordance with E-UTRA standards, to send downlink data to the UE (or request uplink data from the UE), an eNB transmits a scheduling message (e.g., a scheduling or transmission grant message) via downlink control information (DCI) on a downlink control channel (e.g., a physical downlink control channel (PDCCH)) providing parameters for the desired data transmission scheme. The uplink (UL) grant contains parameters provided by the eNB for use in generating the uplink subframe, including transport block size, data modulation and coding scheme (MCS), hybrid automatic repeat request (HARM) information such as Redundancy Version (RV), resource allocation (e.g., resource blocks and position within overall system bandwidth), power control information, and other control information.

Similarly, the DL assignments contain parameters provided by the eNB used for decoding the downlink subframe including transport block size, data modulation and coding scheme, resource allocation (e.g., resource blocks and position within overall system bandwidth), HARQ information, precoding matrix information, and other control information. The UL grants and DL assignments are typically transmitted over the PDCCH.

Data is sent in transport blocks (e.g., defining media access control packet data units (MAC-PDUs)), which may be of varying size. One or two transport blocks may be defined per UL or DL assignment. As noted previously, transport block size information is sent from an eNB to a UE in, for example, systems or connections not using RNs. Where RNs are used, signaling is also provided to and from the RNs.

Size assignments are done by sending transmission data in a control message, which may be sent in the PDCCH. The information may include number of resource blocks (RBs) for an assignment (e.g., x resource blocks), as well as the assigned modulation coding scheme (MCS), which may be function of channel quality information (CQI). These two parameters may then be used by the receiving device to determine a transport block size (TBS). For example, in an exemplary embodiment, these parameters may be used as indices to identify a value in a transport block size lookup table corresponding to a chosen TBS.

FIG. 5 illustrates an example lookup table 500 (this example is taken from technical specification 3GPP TS 36.213 (v9.3.0), Section 7.1.7.2.1)), which is incorporated by reference herein. Using a table such as table 500, a transport block size may be determined based on a row 510 value and a column 520 value. For example, for a column (based on an allocated number of RBs or $N_{PRB}$) value of 6 and an row index (based on an MCS Index or $I_{TBS}$) value of 4, the corresponding transport block size would be 408.

By necessity, a lookup table such as table 500, includes assumptions regarding assumed configurations, such as how may resource elements (REs) are available to carry data. For example, assumptions may be made as to number of antennas, control usage, as well as other data and parameters. These assumptions may be used to generate the data in the lookup table, such as the data included in table 500. Consequently, if the actual amount of data is different than those used for the assumptions, problems with resource element allocation and signaling may occur.

In some implementations, such as, for example, TDD implementations, certain special subframes may be used (as described in, for example, the LTE Release 8 Specification). In these special subframes, a downlink portion, a guard period, and an uplink portion are defined. Consequently, the number of available symbols in these special subframes, as compared to a normal subframe, are less, due in part to the guard period and uplink portion. As a result, the number of available REs or REs per RB will be less.

To address this, a normal lookup table, such as table 400 shown in FIG. 4, may be still be used. However, this may result in inefficiency (i.e., if the number of symbols available is much less, the coding rate may increase, and may even exceed 1, creating problems with decoding).

To accommodate this issue, a different lookup table may be used. However, this approach may also create problems with transmissions and/or storage of the additional table data, as well as other problems. Alternately, the indexing into the lookup table may be adjusted. For example, the assigned number of transport blocks (TBS) may be adjusted, such as by multiplying the received RB allocation by an adjustment factor. In one example, this value may be a pre-defined fixed value of 0.75, which, when multiplied by the number of RBs to generate an adjusted RB value. In this approach, the pre-defined value is fixed in accordance with a specification, and is therefore not configuration or dynamically adjustable.

For example, in one implementation based on table 400, if the received number of RBs is 8, multiplying this by the fixed adjustment value of 0.75 results in an adjusted RB value of 6. This adjusted value may then be used to determine a TBS size from the lookup table. For example, if the row index is 1, the resulting TBS size will be 208 (rather than 256, which would result from an RB value of 8).

In accordance with certain aspects, an alternate implementation allowing for additional control and flexibility may be applied in implementations using relay nodes, such as shown in, for example, FIG. 3. In LTE-A implementations, relaying operation is supported, such as is described in, for example, 3GPP TR 36.814, incorporated by reference herein, and as shown in FIGS. 3 and 4. However, for an in-band relaying operation, a relaying node typically cannot transmit and receive at the same time (i.e., it will be configured to be half-duplex). As a result, subframe resources between the backhaul link (between eNB and relay) and the access link (between relay and UE) may be orthogonalized in time to allow for appropriate signaling, including with regard to legacy devices. To do this, the relay node may use multicast/broadcast single frequency network (MBSFN) subframes (for example, to be compatible with legacy equipment, etc.).

For example, this functionality may be implemented by using a guard period defined in between DL and UL switching at the relaying node, which may be done using an approach similar to that used for the special subframes, as described previously. Those skilled in the art may appreciate that this situation may be considered to be similar, but not identical to, that of the case where downlink pilot time slot (DwPTS) subframes are used. Consequently, a similar but not identical approach can be applied. However, there are several differences. For instance, the configuration of the number of OFDM symbols in a DwPTS subframe as specified implies that the number may vary in a very large range, for example, 3-12 symbols. The cases of interest may be limited to 9-12 symbols for the TBS determination. On the other hand, it is expected that the number of OFDM symbols for relaying backhaul PDSCH transmissions could be limited within a smaller range in some cases. The DwPTS subframes are applicable to most all the UEs, and the same TBS determination is applicable to most all UEs as well. On the other hand, when a subframe is configured for relaying backhaul operation, this subframe may also be used to serve the UEs directly associated with the eNB (these UEs are denoted as direct link UEs). For these UEs, the subframe may still be the same as the regular subframes.

Figure 6:
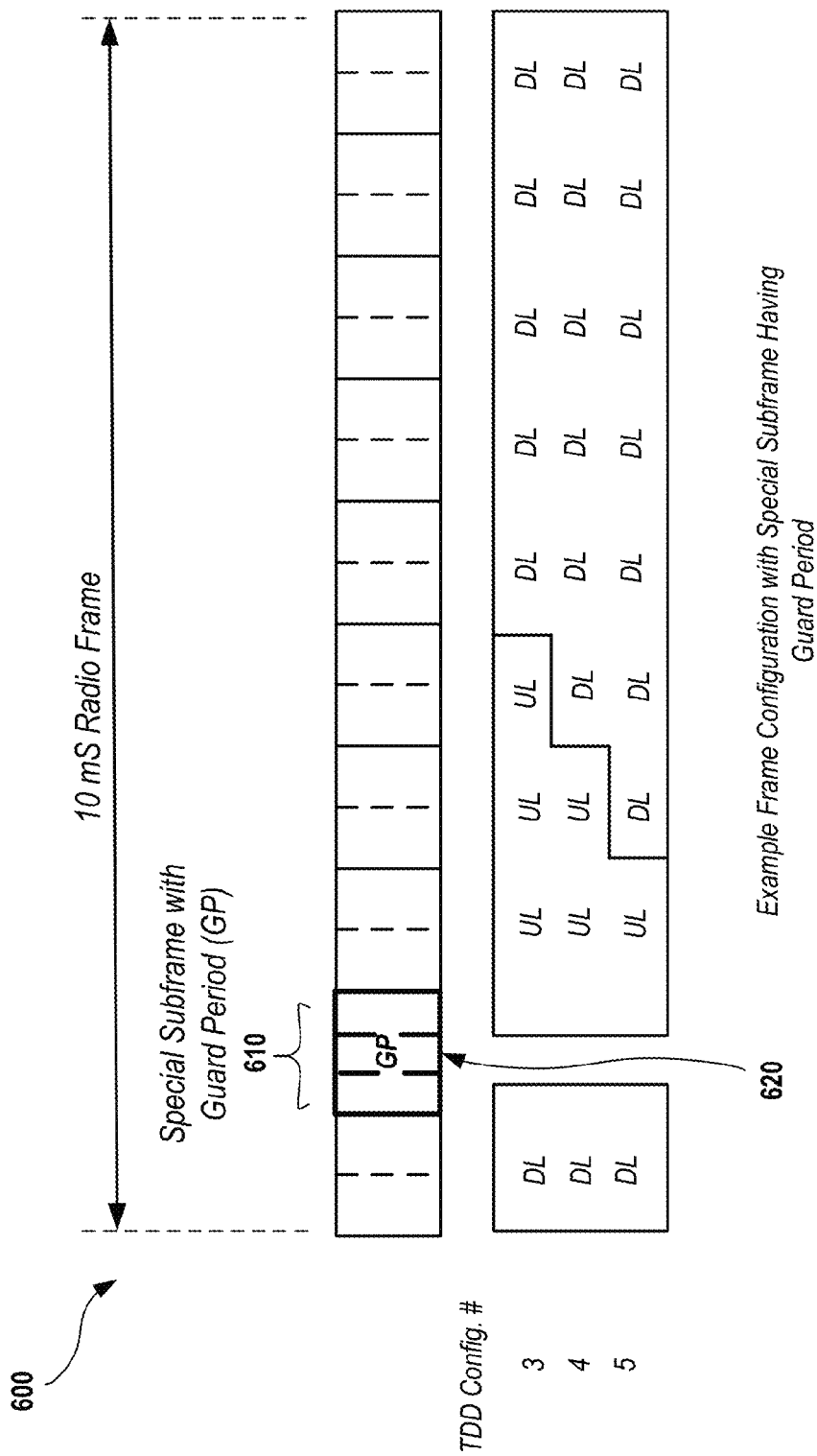
FIG. 6 illustrates details of an example embodiment of a special subframe configuration including a guard period (GP).

An example of this is shown in FIG. 6, which illustrates one example radio frame configuration 600, where a special subframe 610 includes a guard period (GP) 620. It is noted that this particular frame structure is shown for purposes of explanation, and is not intended to be in any way limiting. The guard period may be associated with or define a switching period, wherein signaling in the subframe is changed from downlink to uplink. The example shown in FIG. 6 relates to particular Release 8 TDD special subframe configurations 3, 4, and 5, however, other switching subframe configurations, such as, for example, those used for TDD configuration 0, 1, 2, and 6 (not shown), or other special subframe configurations, such as MBSFN subframes, including a guard period or switching time or period may be used in various implementations. Accordingly, an adjustment factor may be based on, among other factors, switching times or other time allocations associated with DL to UL or UL to DL transition. In some cases, switching times may be very small, in which case adjustment for them may not be needed.

Figure 7:
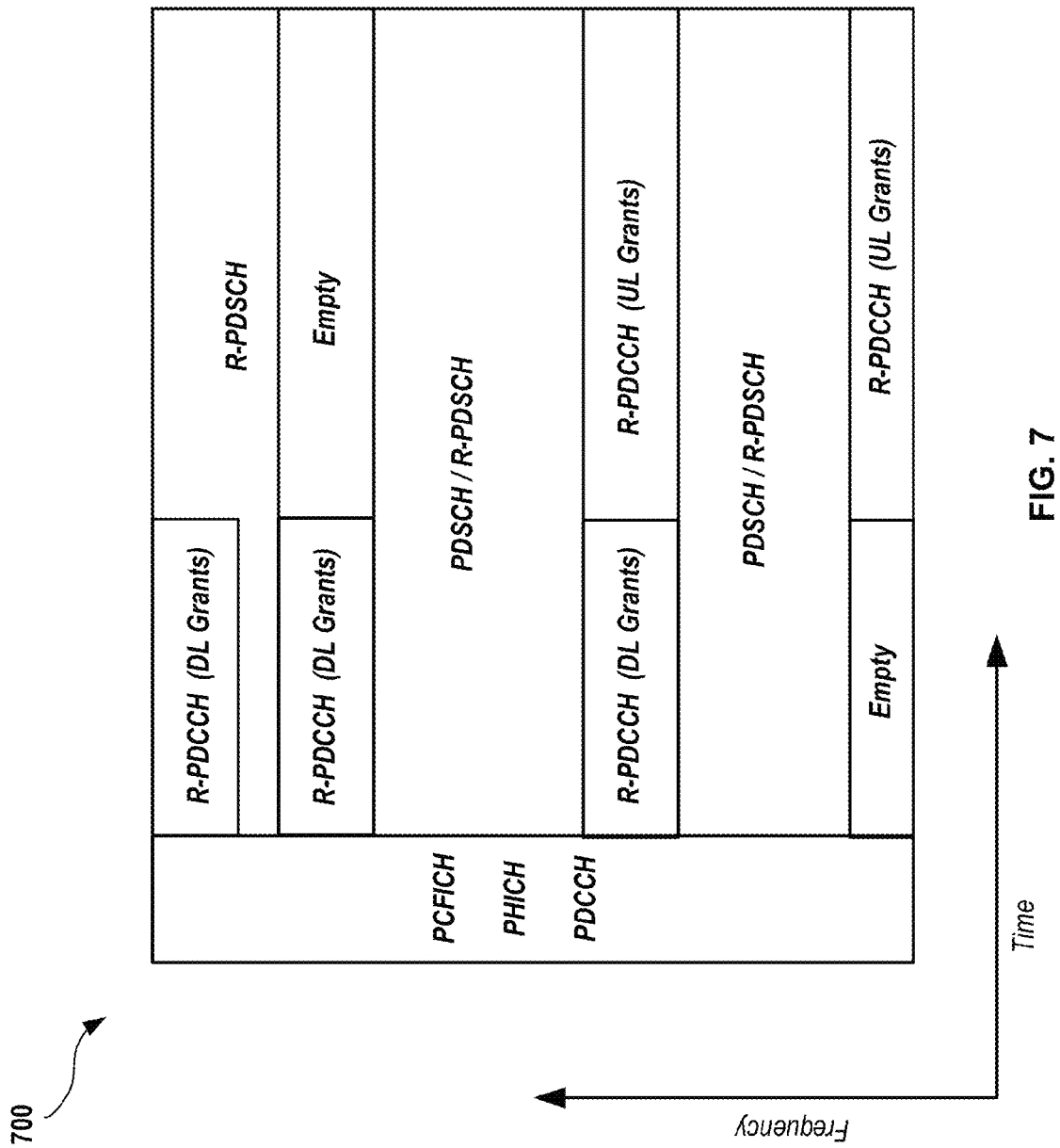
FIG. 7 illustrates an example embodiment of a resource allocation configuration include control and data allocations.

In addition, control signaling, such as, for example, physical downlink control channels (PDCCH) may be mixed with data channels, such as physical downlink shared channels (PDSCH). An example of this is shown in FIG. 7, which illustrates an example resource allocation 700. When this occurs, the number of available resource elements for PDSCH may be reduced with respect to normal operation, which may occur in addition to switching periods allocated due to half-duplex operation, guard bands, and/or propagation delays. Accordingly, an adjustment factor for TBS adjustment may be based on, among other factors, whether control and data allocations are multiplexed (i.e., if control and PDSCH are multiplexed), such as shown in FIG. 7 (e.g., within the same time within the different frequency resources, and/or within frequency during different time resources).

Furthermore, in order to minimize the interference from eNB to a relaying node, in particular in the control region, and/or to simplify the control region design, it may be desirable to intentionally introduce a time offset between synchronized eNB and relaying nodes. This implies that the number of symbols available for relaying backhaul may be smaller than that of the regular subframes, which may also be used for TBS adjustment in some implementations.

Figure 8:
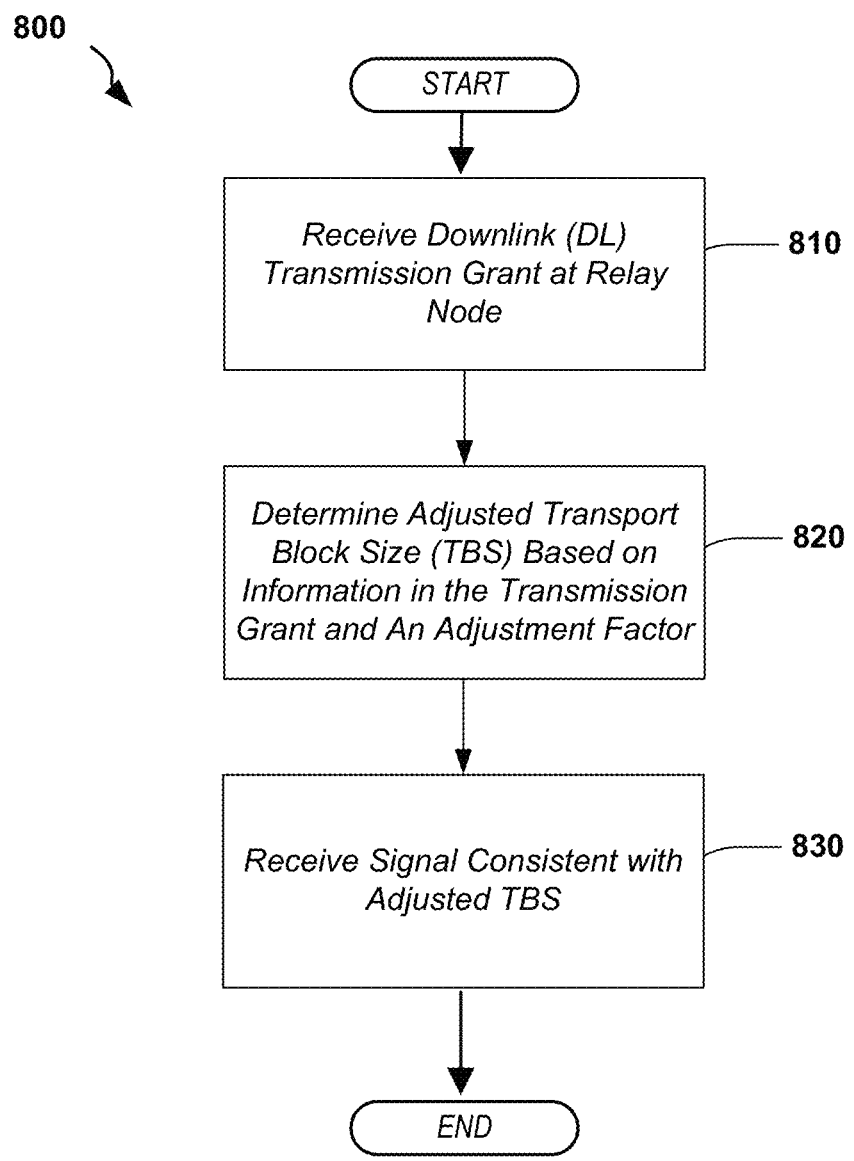
FIG. 8 illustrates an example embodiment of a process for adjusting TBS in a relay node component of a wireless communication system.

FIG. 8 illustrates an example process 800 for adjusting TBS, such as at a relay node. At stage 810, the relay node may receive from a base station, such as a donor eNB, for example, a downlink transmission grant, which may include a number of allocated resource blocks as well as a modulation and coding scheme (MCS) value. In some cases, the DeNB may also send an adjustment factor and/or information usable by the RN for determining an adjustment factor. At stage 820, the RN may use the received information, and/or other information received at or stored in the RN, to determine an adjusted transport block size (TBS). At stage 830, the RN may then receive and/or send a signal consistent with the adjusted TBS.

The determining may include, for example, adjusting an index to a TBS lookup table based on the adjustment factor. The adjustment factor may be based on, for example, a propagation delay and/or time offset between the RN and the DeNB. The adjustment factor may be based on, for example, a multiplexing configuration of control and data information in an RN subframe. The adjustment factor may be based on, for example, a switching time in an RN subframe between a downlink (DL) and an uplink (UL) partition of the subframe. The adjustment factor may be based on, for example, a timing offset between the RN and the DeNB. The adjustment factor may be based on, for example, the available resource elements per resource block, such as the available resource elements for all the resource blocks assigned to the RN. The adjustment factor may be based on, for example, a combination of the above-described parameters, and/or others. In some implementations the adjustment factor may be based on two or more of a propagation delay between the RN and the DeNB, a multiplexing configuration of control and data information in an RN subframe, and a switching time in an RN subframe between a DL and an UL partition of the subframe.

The adjustment factor may be determined at the RN. The adjustment factor may be determined at the DeNB, or at a combination of the DeNB and the RN. In some cases, the adjustment factor may be determined at other network nodes, such as, for example, at one or more nodes of an associated core network. The adjustment factor may be based on a fixed parameter. The adjustment factor may be layer 3 (i.e., MAC layer) configured. The adjustment factor may be dynamically generated, at the DeNB, the RN, a combination of the DeNB and the RN, and/or in combination with other nodes, and may be based on a channel condition or radio transmission characteristic.

Process 800 may further include providing feedback from the RN to the DeNB usable for determining the adjustment factor. The process may further include receiving, from the eNB, based at least in part on the feedback, the adjustment factor or data for use in determining the adjustment factor. The process may further include transmitting a signal consistent with the adjusted TBS from the RN.

Adjustment may be performed by, for example, adjusting a parameter, such as the received number of RBs, by the adjustment factor. For example, the received number of RBs may be multiplied by the adjustment factor to generate an adjusted RB value. The adjusted RB value may then be used as an index into a lookup table, such as the lookup table shown in FIG. 5, to select an adjusted number of transport blocks.

Figure 9:
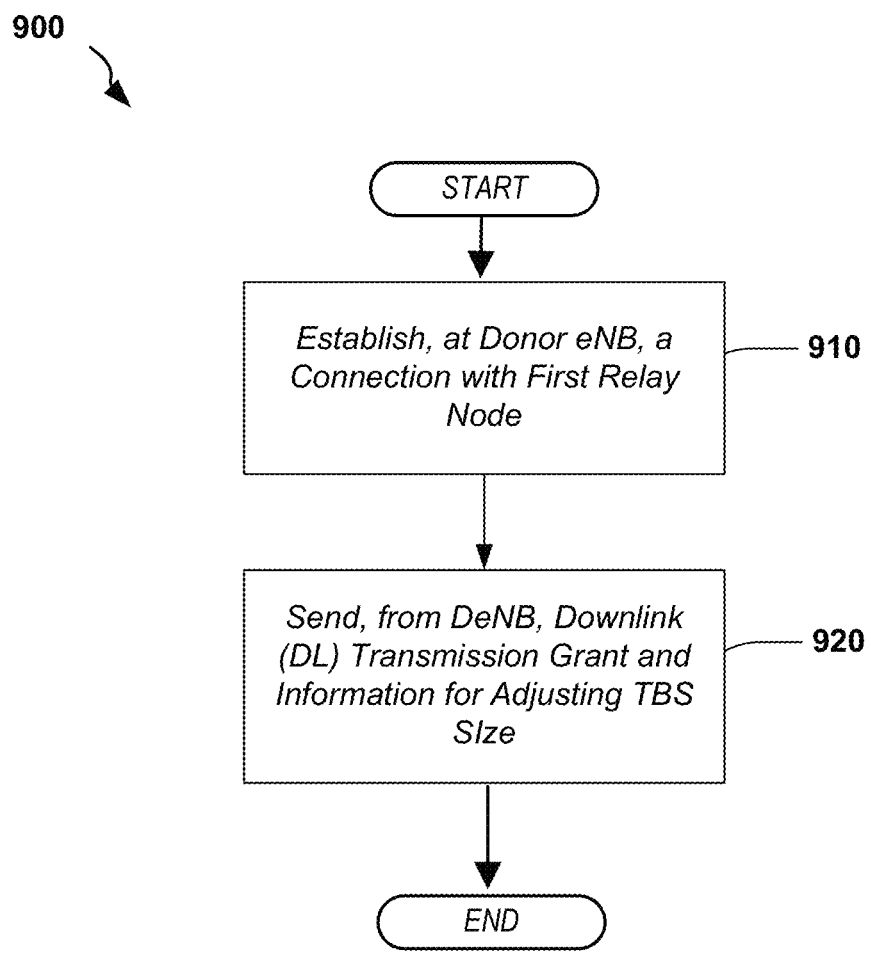
FIG. 9 illustrates an embodiment of a process for facilitating adjustment of TBS in a donor base station component of a wireless communication system.

FIG. 9 illustrates details of a process 900 for facilitating transport block size (TBS) configuration, such as from a donor base station or eNB (DeNB). At stage 910, a communications connection may be established between the DeNB and a relay node (RN). The communication connection may be, for example, a backhaul connection for relaying data from one or more terminals or UEs to the DeNB and/or to core network components connected to the DeNB.

At stage 920, a downlink transmission grant may be sent from the DeNB to the RN. The grant may include, for example, an allocating of resource blocks (RBs), such as a number of allocated physical resource blocks (PRBs). The grant may also include, for example, a modulation and coding scheme (MCS) index. These parameters may be usable by the RN to determine a transport block size (TBS). In addition, information for determining a TBS adjustment factor or an adjustment factor may be provided from the DeNB to the RN. The information or adjustment factor may be usable by the RN to adjust the TBS, which may be done in conjunction with the number of PRBs and the MCS index.

The information for adjusting the TBS may be based on, for example, a propagation delay between the RN and the donor eNB. The information for adjusting the TBS may be based on, for example, a multiplexing configuration of control and data information in an RN subframe. The information for adjusting the TBS may be based on, for example, a switching time in an RN subframe between a downlink (DL) and an uplink (UL) subframe partition. The information for adjusting the TBS may be based on, for example, the available resource elements per resource block, such as the available resource elements for all the resource blocks assigned to the RN. The information may be based on, for example, a timing offset between the RN and the DeNB. The information may be based on combinations of the above-described parameters, as well as others. For example, the information may be based on two or more of a propagation delay between the RN and the DeNB, a multiplexing configuration of control and data information in an RN subframe, and a switching time in an RN subframe between a DL and an UL partition of the subframe.

The information may include, in whole or part, an adjustment factor usable to generate an adjusted TBS at the RN by adjusting a lookup table index. The adjustment factor may be generated at the DeNB based on information received from the RN. The adjustment factor or information for generating the adjustment factor may be generated in part at the RN and provided to the DeNB. In some cases, the adjustment factor or information for generating the adjustment factor may be generated at the RN and provided to the DeNB. In some cases the adjustment factor or information may be generated at another network node, such as a component of an associated core network. The information or adjustment factor may be predefined. The information or adjustment factor may be level 3 configured. The information or adjustment factor may be dynamically generated at the DeNB, RN, and/or other network node or combination of these, based on a channel condition or radio transmission characteristics.

Process 900 may further include, for example, receiving feedback from the RN at the DeNB usable for determining the adjustment factor. The process may further include generating, based at least in part on the feedback, the information usable for adjusting the transport block size. The process may further include sending and/or receiving a signal consistent with the adjusted TBS.

Process 900 may further include, for example, establishing a second connection with a second (and/or additional connections with additional RNs) RN. The process may further include sending, from the DeNB to the second RN, a second downlink (DL) transmission grant and second information usable for adjusting a transport block size (TBS) at the second RN. The configuration and/or characteristics associated with the DeNB and multiple RNs may be different, and different adjustment factors and/or information may be used with each. For example, second information may be different than the first information. Adjustment factors used by the first RN and the second RN (and/or additional RNs) may be different. The different adjustment factors may be based on different configuration parameters and/or channel characteristics in the respective communication links.

Figure 10:
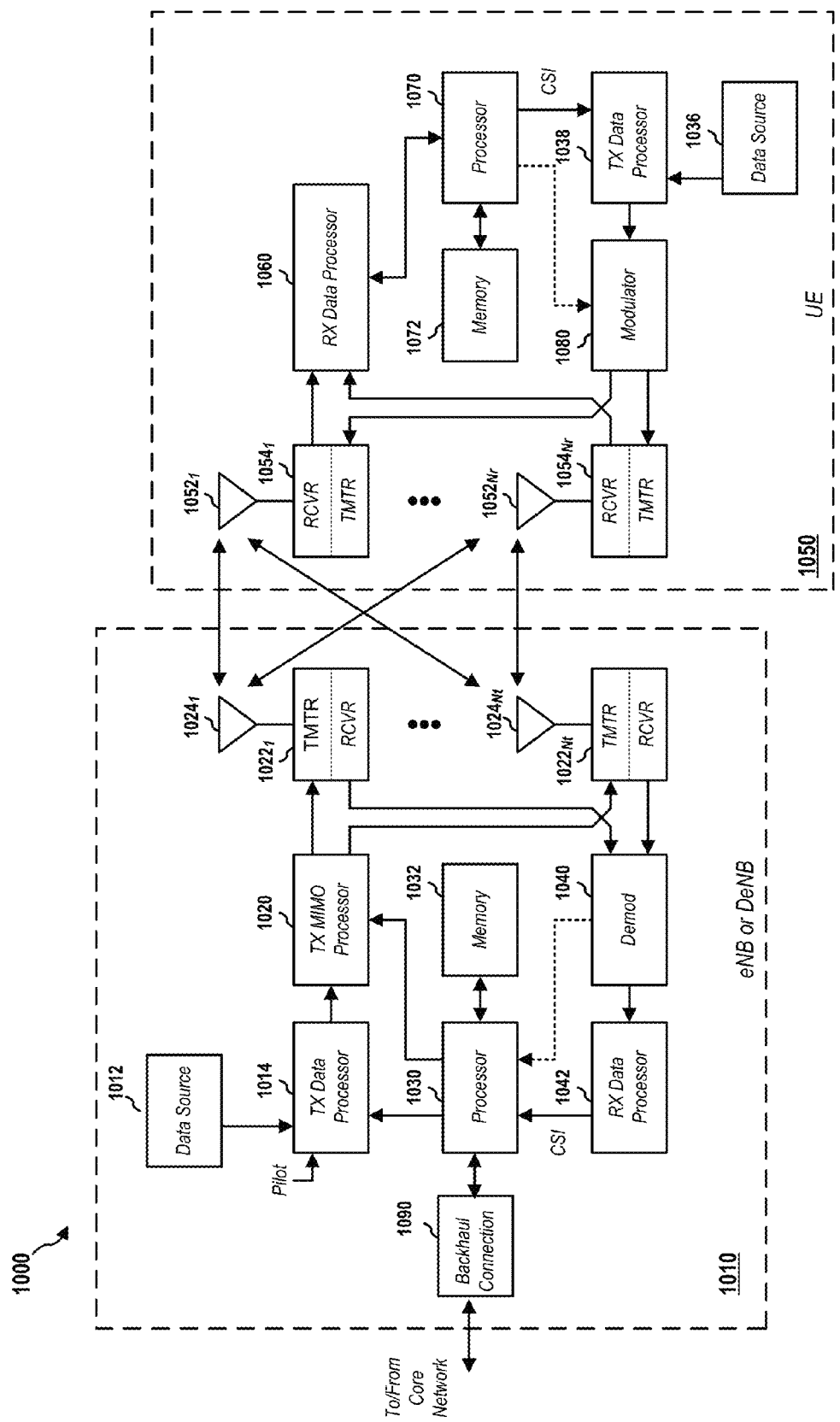
FIG. 10 illustrates details of an embodiment of a communication system including a terminal or UE and a base station or eNB.

FIG. 10 illustrates a block diagram of an example embodiment of base station 1010 (i.e., an eNB, HeNB, etc.) and an example terminal 1050 (i.e., a terminal, AT or UE, etc.) in an example communication system 1000, which may be an LTE system, on which the aspects and functionality described herein may be implemented. A relay node (RN) may be similarly configured to the illustrated base station 1010 and terminal 1050, so as to provide both transmit and receive functionality associated with base station 1010 and 1050. In a relay node configuration, the RN may be in communication with a base station, such as a donor base station or eNB (DeNB), such as is shown in FIGS. 2 and 3, and the DeNB may likewise be similarly configured to base station 1010. These components may correspond to those shown in FIGS. 1-4, and may be configured to implement the processes illustrated previously herein in FIGS. 8-9.

Various functions may be performed in the processors and memories as shown in base station 1510 (and/or in other components not shown), such as coordination with other base stations (not shown) and/or relay nodes to facilitate range extension or other relay functions, to transmit and receive signaling from other base stations and UEs, as well as to provide other functionality as described herein. UE 1050 may include one or more modules to receive signals from base station 1010 and/or other base stations (not shown, such as non-serving base stations described previously herein) to receive DL signals, determine channel characteristics, perform channel estimates, demodulate received data and generate spatial information, determine power level information, and/or determine other information associated with base station 1010 or other base stations (not shown).

In one embodiment, base station 1010 may coordinate with other base stations as described previously herein to determine, generate, and resend signaling, such as signaling associated with relay functionality as described here. This may be done in one or more components (or other components not shown) of base station 1010, such as processors 1014, 1030 and memory 1032. Base station 1010 may also include a transmit module including one or more components (or other components not shown) of eNB 1010, such as transmit modules 1024. Base station 1010 may include an interference cancellation module including one or more components (or other components not shown), such as processors 1030, 1042, demodulator module 1040, and memory 1032 to provide relay functionality as described herein. Base station 1010 may include a adjustment factor or parameter module including one or more components (or other components not shown), such as processors 1030, 1014 and memory 1032 to perform adjustment factors or associated information related to relay functionality as described herein. Base station 1010 may also include a control module for controlling receiver and relay functionality. Base station 1010 may include a network connection module 1090 to provide networking with other systems, such as backhaul systems in a core network (not shown).

Likewise, UE 1050 may include a receive module including one or more components of UE 1050 (or other components not shown), such as receivers 1054. UE 1050 may also include a signal information module including one or more components (or other components not shown) of UE 1050, such as processors 1060 and 1070, and memory 1072. In one embodiment, one or more signals received at UE 1050 are processed to receive DL signals and/or extract information from the DL signals. Additional processing may include estimating channel characteristics, power information, spatial information and/or other information regarding eNBs, such as base station 1010 and/or other base stations (not shown). Memories 1032 and 1072 may be used to store computer code for execution on one or more processors, such as processors 1060, 1070 and 1038, to implement processes associated with the aspects and functionality described herein.

In operation, at the base station 1010, traffic data for a number of data streams may be provided from a data source 1012 to a transmit (TX) data processor 1014, where it may be processed and transmitted to one or more UEs 1050. The transmitted data may be controlled as described previously herein so as to provide interlaced subframe transmissions and/or perform associated signal measurements at one or more UEs 1050.

In one aspect, each data stream is processed and transmitted over a respective transmitter sub-system (shown as transmitters $1024_1$-$1024_{Nt}$) of base station 1010. TX data processor 1014 receives, formats, codes, and interleaves the traffic data for each data stream based on a particular coding scheme selected for that data stream so as to provide coded data. In particular, base station 1010 may be configured to determine a particular reference signal and reference signal pattern and provide a transmit signal including the reference signal and/or beamforming information in the selected pattern.

The coded data for each data stream may be multiplexed with pilot data using OFDM techniques. The pilot data is typically a known data pattern that is processed in a known manner and may be used at the receiver system to estimate the channel response. For example, the pilot data may include a reference signal. Pilot data may be provided to TX data processor 1014 as shown in FIG. 10 and multiplexed with the coded data. The multiplexed pilot and coded data for each data stream may then be modulated (i.e., symbol mapped) based on a particular modulation scheme (e.g., BPSK, QSPK, M-PSK, M-QAM, etc.) selected for that data stream so as to provide modulation symbols, and the data and pilot may be modulated using different modulation schemes. The data rate, coding, and modulation for each data stream may be determined by instructions performed by processor 1030 based on instructions stored in memory 1032, or in other memory or instruction storage media of UE 1050 (not shown).

The modulation symbols for all data streams may then be provided to a TX MIMO processor 1020, which may further process the modulation symbols (e.g., for OFDM implementation). TX MIMO processor 1020 may then provide Nt modulation symbol streams to $N_t$ transmitters (TMTR) $1022_1$ through $1022_{Nt}$. The various symbols may be mapped to associated RBs for transmission.

TX MIMO processor 1030 may apply beamforming weights to the symbols of the data streams and corresponding to the one or more antennas from which the symbol is being transmitted. This may be done by using information such as channel estimation information provided by or in conjunction with the reference signals and/or spatial information provided from a network node such as a UE. For example, a beam B=transpose([b1 b2 . . . $b_{Nt}$]) composes of a set of weights corresponding to each transmit antenna. Transmitting along a beam corresponds to transmitting a modulation symbol x along all antennas scaled by the beam weight for that antenna; that is, on antenna t the transmitted signal is bt*x. When multiple beams are transmitted, the transmitted signal on one antenna is the sum of the signals corresponding to different beams. This can be expressed mathematically as B1x1+B2x2+$BN_s$x$N_s$, where $N_s$ beams are transmitted and xi is the modulation symbol sent using beam Bi. In various implementations beams could be selected in a number of ways. For example, beams could be selected based on channel feedback from a UE, channel knowledge available at the eNB, or based on information provided from a UE to facilitate interference mitigation, such as with an adjacent macrocell.

Each transmitter sub-system $1022_1$ through $1022_{Nt}$ receives and processes a respective symbol stream to provide one or more analog signals, and further conditions (e.g., amplifies, filters, and upconverts) the analog signals to provide a modulated signal suitable for transmission over the MIMO channel. $N_t$ modulated signals from transmitters $1022_1$ through $1022_{Nt}$ are then transmitted from $N_t$ antennas $1024_1$ through $1024_{Nt}$, respectively.

At UE 1050, the transmitted modulated signals are received by $N_r$ antennas $1052_1$ through $1052_{Nr}$ and the received signal from each antenna 1052 is provided to a respective receiver (RCVR) $1054_1$ through $1052_{Nr}$. Each receiver 1054 conditions (e.g., filters, amplifies and downconverts) a respective received signal, digitizes the conditioned signal to provide samples, and further processes the samples to provide a corresponding "received" symbol stream.

An RX data processor 1060 then receives and processes the $N_r$ received symbol streams from $N_r$ receivers $1054_1$ through $1052_{Nr}$ based on a particular receiver processing technique so as to provide $N_s$ "detected" symbol streams so at to provide estimates of the $N_s$ transmitted symbol streams. The RX data processor 1060 then demodulates, deinterleaves, and decodes each detected symbol stream to recover the traffic data for the data stream. The processing by RX data processor 1060 is typically complementary to that performed by TX MIMO processor 1020 and TX data processor 1014 in base station 1010.

A processor 1070 may periodically determine a precoding matrix for use as is described further below. Processor 1070 may then formulate a reverse link message that may include a matrix index portion and a rank value portion. In various aspects, the reverse link message may include various types of information regarding the communication link and/or the received data stream. The reverse link message may then be processed by a TX data processor 1038, which may also receive traffic data for a number of data streams from a data source 1036 which may then be modulated by a modulator 1080, conditioned by transmitters $1054_1$ through $1054_{Nr}$, and transmitted back to base station 1010. Information transmitted back to base station 1010 may include power level and/or spatial information for providing beamforming to mitigate interference from base station 1010.

At base station 1010, the modulated signals from UE 1050 are received by antennas 1024, conditioned by receivers 1022, demodulated by a demodulator 1040, and processed by a RX data processor 1042 to extract the message transmitted by UE 1050. Processor 1030 then determines which precoding matrix to use for determining beamforming weights, and then processes the extracted message.

Figure 11:
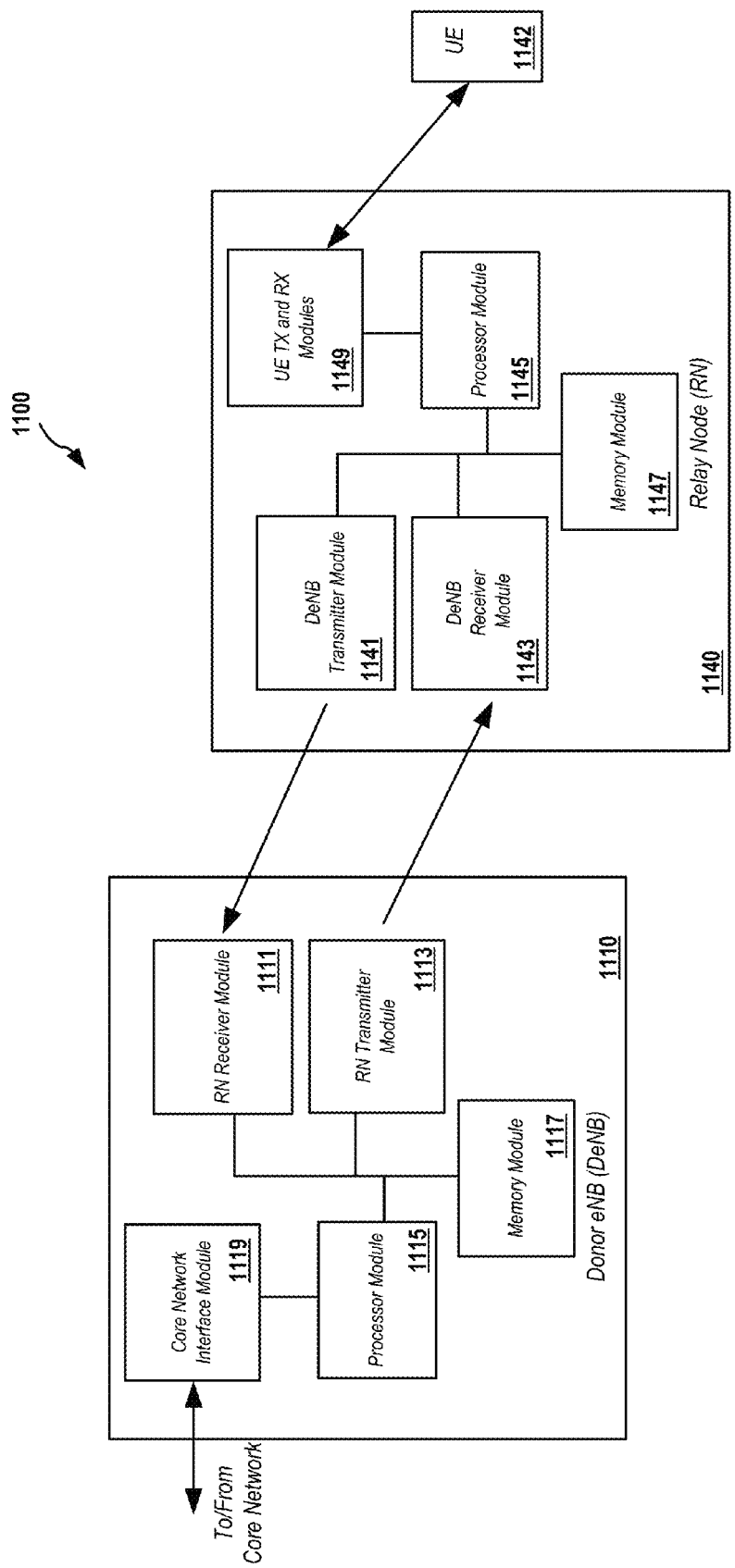
FIG. 11 illustrates details of a relay node component and a donor base station component in a wireless communication system.

FIG. 11 illustrates an embodiment of a communications system including a donor base station component (DeNB) 1110 and a relay node component (RN) 1140, which may correspond to components illustrated in FIGS. 2, 3, and 15. A terminal or UE 1142 may be in communication with the relay component, which may be configured to function as a relay between the UE 1142 and DeNB 1110. RN 1140 may include modules as shown in FIG. 11 (as well as other modules not explicitly shown for clarity but apparent to one of skill in the art). In particular, RN 1140 may include one or more processor module 1145, which may be coupled to one or more memory module 1147, which may comprise one or more physical memory components or devices. Processor module 1145 may also be coupled with UE transmit and receive modules 1149, which may be configured to communicate with UE 1142, such as is shown in FIG. 10. The processor module may be configured to perform the RN functionality described previously herein, including receiving adjustment information or parameters and adjusting transmission block size based on the information. The processor may also be configured to receive and send data and information to DeNB 1110, which may be done via transmitter module 1141 and receiver module 1143. Data may include data generated and sent from the RN for use by the DeNB to generate TBS adjustment parameters or factors or other TBS adjustment information. Data and/or codes for causing a processor or computer component of RN 1140, such as processor module 1145, to execute instructions, may be stored in memory module 1147, and the instructions may be executed on one or more processors in the processor module. The one or more processors may include special purpose processors configured to process data and information in a communications device, such as as UE, eNB, RN, and the like.

DeNB 1110 may be configured to communicate with RN 1140 in the capacity of a donor base station, and may also be configured to communicate with other RNs (not shown) and/or directly with other UEs (not shown). DeNB 1110 may include receiver and transmitter modules 1111 and 1113, respectively configured to communicate with RN to send data and information such as downlink grants, and/or information for adjusting TBS size, and or adjustment factors or parameters. This may be done using one or more processor modules 1115, which may be coupled to one or more memory modules 1117, which may comprise one or more physical memory components or devices. Processor module 1115 may also be coupled with transmit and receive modules 1111 and 1113, which may be configured to communicate with RN 1140. The processor module may be configured to perform the DeNB functionality described previously herein, including receiving adjustment information or parameters from RN 1140 and generating and/or sending information for adjusting transmission block size or adjustment factors or parameters. The processor may also be configured to receive and send data and information to and from a core network (now shown), which may be done core network interface 1119. Data and/or codes for causing a processor or computer component of DeNB 1110, such as processor module 1115, to execute instructions, may be stored in memory module 1117, and the instructions may be executed on one or more processors in the processor module. The one or more processors may include special purpose processors configured to process data and information in a communications device, such as as UE, eNB, RN, and the like.

In some configurations, the apparatus for wireless communication includes means for performing various functions as described herein. In one aspect, the aforementioned means may be a processor or processors and associated memory in which embodiments reside, such as are shown in FIGS. 10 and 11, and which are configured to perform the functions recited by the aforementioned means. The may be, for example, modules or apparatus residing in UEs, DeNBs, RNs, and/or other network nodes, such as are shown in FIGS. 1-3 and 10-11, to perform the relay TBS adjustment functions and other functions as are described herein. In another aspect, the aforementioned means may be a module or any apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

We claim:

1. A method for providing communications, comprising:
receiving, at a relay node (RN) from a donor base station (DeNB), a downlink transmission grant; and
determining, at the RN, an adjusted transport block size (TBS) based on information in the transmission grant and an adjustment factor, wherein the information in the transmission grant includes a resource allocation, the adjustment factor is based on at least one of estimated and actual availability of resources allocated to the RN, and wherein the determining comprises adjusting an index to a TBS lookup table based on the adjustment factor, the adjustment factor is based on two or more of a propagation delay between the RN and the DeNB, a multiplexing configuration of control and data information in an RN subframe, a switching time in the RN subframe between a DL and an UL partition of the subframe, a timing offset between the RN and the DeNB, and an available number of resource elements for resource blocks assigned to the RN.

2. The method of claim 1, wherein the adjustment factor is based on the propagation delay between the RN and the DeNB.

3. The method of claim 1, wherein the adjustment factor is based on the multiplexing configuration of control and data information in the RN subframe.

4. The method of claim 1, wherein the adjustment factor is based on the switching time in the RN subframe between the downlink (DL) and the uplink (UL) partition of the subframe.

5. The method of claim 1, wherein the adjustment factor is based on the timing offset between the RN and the DeNB.

6. The method of claim 1, wherein the adjustment factor is based on the available number of resource elements per resource block for resource blocks assigned to the RN.

7. The method of claim 1, wherein the adjustment factor is determined at the RN.

8. The method of claim 1, wherein the adjustment factor is determined at the DeNB.

9. The method of claim 1, wherein the adjustment factor is based on a fixed parameter.

10. The method of claim 1, wherein the adjustment factor is dynamically generated based on a channel condition or radio transmission characteristic.

11. The method of claim 1, further comprising:
providing feedback from the RN to the DeNB usable for determining the adjustment factor; and
receiving, from the DeNB, based at least in part on the feedback, the adjustment factor or data for use in determining the adjustment factor.

12. The method of claim 1, further comprising transmitting a signal consistent with the adjusted TBS.

13. A computer program product comprising a non-transitory computer-readable medium including codes for causing a computer to:
receive a downlink transmission grant; and
determine an adjusted transport block size (TBS) based on information in the transmission grant and an adjustment factor, wherein the information in the transmission grant includes a resource allocation, the adjustment factor is based on at least one of estimated and actual availability of resources allocated to a node that receives the downlink transmission grant, and wherein the adjustment factor is based on two or more of a propagation delay between an RN and a DeNB, a multiplexing configuration of control and data information in an RN subframe, a switching time in the RN subframe between a DL and an UL partition of the subframe, a timing offset between the RN and the DeNB, and an available number of resource elements per resource block for resource blocks assigned to the RN.

14. The computer program product of claim 13, wherein the downlink transmission grant is received at an RN from a DeNB and the adjustment factor based on the propagation delay between the RN and the DeNB.

15. The computer program product of claim 13, wherein the adjustment factor is based on the multiplexing configuration of control and data information in the RN subframe.

16. The computer program product of claim 13, wherein the adjustment factor is based on the switching time in the RN subframe between the downlink (DL) and the uplink (UL) partition of the subframe.

17. The computer program product of claim 13, wherein the adjustment factor is based on the timing offset between the RN and the DeNB.

18. The computer program product of claim 13, wherein the adjustment factor is based on the available number of resource elements per resource block for the resource blocks assigned to the RN.

19. The computer program product of claim 13, wherein the codes include codes for determining the adjustment factor at the RN.

20. The computer program product of claim 13, wherein the codes further include codes for providing feedback from the RN to the DeNB usable for determining the adjustment factor, and receiving, from the DeNB, based at least in part on the feedback, the adjustment factor or data for use in determining the adjustment factor.

21. The computer program product of claim 13, wherein the codes further include codes for causing the computer to transmit a signal consistent with the adjusted TBS.

22. A relay node (RN), comprising:
a receiver module configured to receive, from a DeNB, a downlink transmission grant; and
a processor module configured to determine an adjusted transport block size (TBS) based on information in the transmission grant and an adjustment factor, wherein the information in the transmission grant includes a resource allocation, the adjustment factor is based on at least one of estimated and actual availability of resources allocated to the RN, and wherein the determining comprises adjusting an index to a TBS lookup table based on the adjustment factor, the adjustment factor is based on two or more of a propagation delay between the RN and the DeNB, a multiplexing configuration of control and data information in an RN subframe, a switching time in the RN subframe between a DL and an UL partition of the subframe, a timing offset between the RN and the DeNB, and an available number of resource elements per resource block for the resource blocks assigned to the RN.

23. The relay node of claim 22, wherein the adjustment factor is based on the propagation delay between the RN and the DeNB.

24. The relay node of claim 22, wherein the adjustment factor based on the multiplexing configuration of control and data information in the RN subframe.

25. The relay node of claim 22, wherein the adjustment factor is based on the switching time in the RN subframe between the downlink (DL) and the uplink (UL) partition of the subframe.

26. The relay node of claim 22, wherein the adjustment factor is based on the timing offset between the RN and the DeNB.

27. The relay node of claim 22, wherein the adjustment factor is based on the available number of resource elements per resource block for the resource blocks assigned to the RN.

28. The relay node of claim 22, wherein the adjustment factor is determined at the RN.

29. The relay node of claim 22, wherein the adjustment factor is based on a fixed parameter.

30. The relay node of claim 22, wherein the adjustment factor is dynamically generated based on a channel condition or radio transmission characteristic.

31. The relay node of claim 22, further comprising a transmitter module configured to provide feedback to the DeNB usable for determining the adjustment factor, wherein the receiver module is further configured to receive, from the DeNB, based at least in part on the feedback, the adjustment factor or data for use in determining the adjustment factor.

32. The relay node of claim 22, further comprising a transmitter module configured to send a signal consistent with the adjusted TBS.

33. A communications device, comprising:
means for receiving, at a relay node (RN) from a DeNB, a downlink transmission grant; and
means for determining, at the RN, an adjusted transport block size (TBS) based on information in the transmission grant and an adjustment factor, wherein the information in the transmission grant includes a resource allocation, the adjustment factor is based on at least one of estimated and actual availability of resources allocated to the RN, and wherein the means for determining adjusts an index to a TBS lookup table based on the adjustment factor, the adjustment factor is based on one or more of a propagation delay between the RN and the DeNB, a multiplexing configuration of control and data information in an RN subframe, a switching time in an RN subframe between a DL and an UL partition of the subframe, and an available number of resource elements per resource block for the resource blocks assigned to the RN.

34. A method for providing communications, comprising:
establishing, at a Donor eNB (DeNB), a connection with a first relay node (RN); and
sending, from the DeNB to the first RN, a downlink (DL) transmission grant and first information usable for adjusting a transport block size (TBS) at the first RN, wherein the DL transmission grant includes a resource allocation, the first information pertains to at least one of estimated and actual availability of resources allocated to the first RN, and wherein the first information comprises an adjustment factor usable to generate an adjusted TBS at the first RN by adjusting a lookup table index, the first information is based on two or more of a propagation delay between the first RN and the DeNB, a multiplexing configuration of control and data information in an RN subframe, a switching time in an RN subframe between a DL and an UL partition of the subframe, a timing offset between the first RN and the DeNB, and an available number of resource elements per resource block for the resource blocks assigned to the first RN.

35. The method of claim 34, wherein the first information for adjusting the TBS is based on the propagation delay between the first RN and the DeNB.

36. The method of claim 34, wherein the first information for adjusting is based on the multiplexing configuration of control and data information in the RN subframe.

37. The method of claim 34, wherein the first information for adjusting is based on the switching time in an RN subframe between the downlink (DL) and the uplink (UL).

38. The method of claim 34, wherein the first information for adjusting is based on the timing offset between the first RN and the DeNB.

39. The method of claim 34, wherein the adjustment factor is generated at the DeNB based on information received from the first RN.

40. The method of claim 34, wherein the first information is dynamically generated at the DeNB based on a channel condition or radio transmission characteristics.

41. The method of claim 34, further comprising receiving feedback from the first RN at the DeNB usable for determining the adjustment factor; and
generating, based at least in part on the feedback, the first information usable for adjusting the transport block size.

42. The method of claim 34, further comprising receiving, from the first RN, a signal consistent with the adjusted TBS.

43. The method of claim 34, further comprising establishing a second connection with a second RN; and
sending, from the DeNB to the second RN, a second downlink (DL) transmission grant and second information usable for adjusting a transport block size (TBS) at the second RN.

44. The method of claim 43, wherein the second information is different than the first information.

45. A computer program product comprising a non-transitory computer-readable medium including codes for causing a computer to:
establish a connection with a relay node (RN); and
send to the RN a downlink (DL) transmission grant, including a lookup table index, and information usable for adjusting a transport block size (TBS) at the RN, wherein the DL transmission grant includes a resource allocation, wherein the information pertains to at least one of estimated and actual availability of resources allocated to the RN, and wherein the information comprises an adjustment factor usable to generate an adjusted TBS at the RN by adjusting the received lookup table index.

46. A donor eNB, comprising:
a receiver module configured to establish a connection with a relay node (RN); and
a transmitter module configured to send to the RN a downlink (DL) transmission grant, including a lookup table index, and information usable for adjusting a transport block size (TBS) at the RN, wherein the DL transmission grant includes a resource allocation, wherein the information pertains to at least one of estimated and actual availability of resources allocated to the RN, and wherein the information comprises an adjustment factor usable to generate an adjusted TBS at the RN by adjusting the received lookup table index.

47. A communications device, comprising:
means for establishing a connection with a relay node (RN); and
means for sending to the RN a downlink (DL) transmission grant, including a lookup table index, and information usable for adjusting a transport block size (TBS) at the RN, wherein the DL transmission grant includes a resource allocation, wherein the information pertains to at least one of estimated and actual availability of resources allocated to the RN, and wherein the information comprises an adjustment factor usable to generate an adjusted TBS at the RN by adjusting the received lookup table index.

* * * * *